US011401416B2

(12) United States Patent
Pasetti et al.

(10) Patent No.: US 11,401,416 B2
(45) Date of Patent: Aug. 2, 2022

(54) FLAME RETARDANT POLYAMIDE COMPOSITION

(71) Applicant: Celanese Sales Germany GmbH, Taunus (DE)

(72) Inventors: Guglielmo Pasetti, Lodi (IT); Holger Brandt, Schwanau (DE)

(73) Assignee: Celanese Sales Germany GmbH, Sulzbach Taunus (DE)

( * ) Notice: Subject to any disclaimer, the term of this patent is extended or adjusted under 35 U.S.C. 154(b) by 0 days.

(21) Appl. No.: 16/162,474

(22) Filed: Oct. 17, 2018

(65) Prior Publication Data

US 2019/0112476 A1 Apr. 18, 2019

Related U.S. Application Data

(60) Provisional application No. 62/573,285, filed on Oct. 17, 2017.

(51) Int. Cl.
| | |
|---|---|
| *C08L 77/02* | (2006.01) |
| *C08L 77/06* | (2006.01) |
| *C08K 5/00* | (2006.01) |
| *C08K 5/5353* | (2006.01) |
| *C08K 7/14* | (2006.01) |
| *C08K 3/38* | (2006.01) |
| *C08K 13/04* | (2006.01) |
| *C08K 5/49* | (2006.01) |
| *C08K 3/013* | (2018.01) |
| *C08K 3/016* | (2018.01) |
| *C08K 3/32* | (2006.01) |
| *C08K 7/04* | (2006.01) |

(52) U.S. Cl.
CPC .............. *C08L 77/02* (2013.01); *C08K 3/38* (2013.01); *C08K 5/0066* (2013.01); *C08K 5/5353* (2013.01); *C08K 7/14* (2013.01); *C08K 13/04* (2013.01); *C08L 77/06* (2013.01); *C08K 3/013* (2018.01); *C08K 3/016* (2018.01); *C08K 3/32* (2013.01); *C08K 5/49* (2013.01); *C08K 7/04* (2013.01); *C08K 2003/387* (2013.01); *C08L 2201/02* (2013.01); *C08L 2203/20* (2013.01); *C08L 2205/02* (2013.01)

(58) Field of Classification Search
CPC .................................................. C08K 5/5353
See application file for complete search history.

(56) References Cited

U.S. PATENT DOCUMENTS

| | | | |
|---|---|---|---|
| 3,515,703 A * | 6/1970 | Ueda | ............... D01F 8/12 528/324 |
| 5,773,556 A | 6/1998 | Kleiner et al. | |
| 6,255,371 B1 | 7/2001 | Schlosser et al. | |
| 6,365,071 B1 | 4/2002 | Jenewein et al. | |
| 6,447,913 B1 | 9/2002 | Watanabe et al. | |
| 6,503,969 B1 | 1/2003 | Klatt et al. | |
| 6,512,027 B2 | 1/2003 | Kanai et al. | |
| 6,547,992 B1 | 4/2003 | Schlosser et al. | |
| 6,660,789 B2 | 12/2003 | Uno et al. | |
| 6,964,746 B2 | 11/2005 | Schlosser et al. | |
| 7,109,260 B2 | 9/2006 | Kaprinidis et al. | |
| 7,255,814 B2 | 8/2007 | Hoerold et al. | |
| 7,259,200 B2 | 8/2007 | Bauer et al. | |
| 7,323,504 B2 | 1/2008 | Steenbakkers-Menting et al. | |
| 7,358,285 B2 | 4/2008 | Ottenheijm | |
| 7,446,140 B2 | 11/2008 | Bauer et al. | |
| 7,592,382 B2 | 9/2009 | Borade et al. | |
| 7,803,856 B2 | 9/2010 | Perego et al. | |
| 7,807,737 B2 | 10/2010 | Yao et al. | |
| 7,812,077 B2 | 10/2010 | Borade et al. | |
| 7,816,438 B2 | 10/2010 | Seki et al. | |
| 7,879,954 B2 | 2/2011 | Yao et al. | |
| 7,923,506 B2 | 4/2011 | Cohoon et al. | |
| 8,003,722 B2 | 8/2011 | Levchik et al. | |
| 8,053,500 B2 | 11/2011 | Morimoto et al. | |
| 8,101,042 B2 | 1/2012 | Gantner et al. | |
| 8,101,678 B2 | 1/2012 | Roth | |
| 8,178,607 B2 | 5/2012 | Costanzi et al. | |
| 8,193,263 B2 | 6/2012 | Fujii | |
| 8,236,881 B2 | 8/2012 | Roth | |
| 8,362,119 B2 | 1/2013 | Endtner et al. | |
| 8,426,519 B2 | 4/2013 | Cogen et al. | |
| 8,450,407 B2 | 5/2013 | Prusty et al. | |
| 8,575,246 B2 | 11/2013 | Ishii et al. | |

(Continued)

FOREIGN PATENT DOCUMENTS

| | | |
|---|---|---|
| CN | 101503569 A | 8/2009 |
| CN | 101812231 A | 8/2010 |

(Continued)

OTHER PUBLICATIONS

Product Information on Glow Wire, UL 94 V-O Universal Mate-N-Lok Connector from TE Connectivity, 1 page.

(Continued)

*Primary Examiner* — Peter F Godenschwager

(74) *Attorney, Agent, or Firm* — Dority & Manning, P.A.

(57) ABSTRACT

A polyamide composition comprising a polyamide; a plurality of inorganic fibers; and a flame retardant system comprising a zinc phosphinate and a nitrogen-containing polyphosphate is provided. At thicknesses of from about 0.4 to about 3.2 millimeters, the composition exhibits a Glow Wire Ignition Temperature of about 775° C. or more as determined in accordance with IEC-60695-2-13:2010; a Glow Wire End Product Temperature (without flame) of about 750° C. or more as determined in accordance with IEC-60335-1:2010; a Glow Wire Flammability Index of about 850° C. or more as determined in accordance with IEC-60695-2-12:2010; a V0 rating as determined in accordance with UL94; and/or a comparative tracking index of about 550 volts or more as determined in accordance with IEC 60112:2003.

22 Claims, No Drawings

(56) References Cited

U.S. PATENT DOCUMENTS

| | | | |
|---|---|---|---|
| 8,592,549 B1 | 11/2013 | Grcev et al. |
| 8,710,132 B2 | 4/2014 | Ogasawara et al. |
| 8,734,956 B2 | 5/2014 | Sakata et al. |
| 8,765,849 B2 | 7/2014 | Blondel et al. |
| 8,859,652 B2 | 10/2014 | Buehler et al. |
| 8,895,648 B2 | 11/2014 | Timberlake et al. |
| 8,987,359 B2 | 3/2015 | Kang et al. |
| 9,006,306 B2 | 4/2015 | La Camera et al. |
| 9,018,413 B2 | 4/2015 | Hill et al. |
| 9,068,061 B2 | 6/2015 | Hoerold et al. |
| 9,150,710 B2 | 10/2015 | Hoerold et al. |
| 9,221,948 B2 | 12/2015 | Timberlake et al. |
| 9,481,831 B2 | 11/2016 | Bauer et al. |
| 9,505,904 B2 | 11/2016 | Bauer et al. |
| 9,534,109 B2 | 1/2017 | Hoerold et al. |
| 9,745,449 B2 | 8/2017 | Stockdale et al. |
| 9,752,009 B2 | 9/2017 | Stockdale et al. |
| 9,752,011 B2 | 9/2017 | Stockdale et al. |
| 9,758,640 B2 | 9/2017 | Stockdale et al. |
| 9,765,204 B2 | 9/2017 | Timberlake et al. |
| 9,828,503 B2 | 11/2017 | Roth et al. |
| 9,845,389 B2 | 12/2017 | Harder et al. |
| 9,879,136 B2 | 1/2018 | Zhou et al. |
| 9,879,137 B2 | 1/2018 | Zhou et al. |
| 9,905,961 B2 | 2/2018 | Krijgsman |
| 9,922,749 B2 | 3/2018 | Yu et al. |
| 10,017,628 B2 | 7/2018 | Hoekstra et al. |
| 10,093,801 B2 | 10/2018 | Zucchelli |
| 10,113,039 B2 | 10/2018 | Hoekstra et al. |
| 10,118,990 B2 | 11/2018 | Gutmann et al. |
| 10,202,549 B2 | 2/2019 | Bauer et al. |
| 10,240,028 B2 | 3/2019 | Zucchelli |
| 10,364,339 B2 | 7/2019 | Tamura et al. |
| 10,584,230 B2 | 3/2020 | Raemakers-Franken et al. |
| 2002/0045688 A1* | 4/2002 | Galli .................. C08K 3/22 524/100 |
| 2006/0020064 A1 | 1/2006 | Bauer et al. |
| 2006/0089435 A1 | 4/2006 | Hoerold et al. |
| 2006/0214144 A1 | 9/2006 | Bauer et al. |
| 2008/0320395 A1 | 12/2008 | Yuasa |
| 2010/0113657 A1 | 5/2010 | Seki |
| 2010/0261818 A1 | 10/2010 | Seki |
| 2010/0261819 A1 | 10/2010 | Seki |
| 2011/0257313 A1 | 10/2011 | Seki |
| 2013/0190432 A1 | 7/2013 | Krause et al. |
| 2013/0210968 A1 | 8/2013 | Hoerold et al. |
| 2014/0066551 A1 | 3/2014 | Greev et al. |
| 2014/0288236 A1 | 9/2014 | Depierro et al. |
| 2014/0371357 A1 | 12/2014 | Hoekstra et al. |
| 2015/0005427 A1 | 1/2015 | Bauer et al. |
| 2015/0252188 A1 | 9/2015 | Van Der Burgt |
| 2015/0337204 A1 | 11/2015 | Yamazaki et al. |
| 2016/0009918 A1 | 1/2016 | Hoerold et al. |
| 2016/0083638 A1 | 3/2016 | Duis et al. |
| 2016/0340588 A1 | 11/2016 | Bauer et al. |
| 2017/0044336 A1 | 2/2017 | Hoekstra et al. |
| 2018/0086899 A1 | 3/2018 | Roth et al. |
| 2018/0118937 A1 | 5/2018 | Van Der Burgt |
| 2018/0119017 A1 | 5/2018 | Schlosser et al. |
| 2019/0153197 A1 | 5/2019 | Krause et al. |
| 2019/0194543 A1 | 6/2019 | Bauer et al. |
| 2019/0225772 A1 | 7/2019 | Bauer et al. |
| 2019/0225773 A1 | 7/2019 | Bauer et al. |
| 2019/0233642 A1 | 8/2019 | Osborn et al. |
| 2019/0322805 A1 | 10/2019 | Langrick et al. |
| 2019/0338123 A1 | 11/2019 | Hattori et al. |
| 2020/0062925 A1 | 2/2020 | Tamai et al. |
| 2020/0115551 A1 | 4/2020 | Van Den Poel et al. |
| 2020/0216613 A1 | 7/2020 | White |
| 2020/0224006 A1 | 7/2020 | Kraemer et al. |
| 2020/0308402 A1 | 10/2020 | White |

FOREIGN PATENT DOCUMENTS

| | | |
|---|---|---|
| CN | 101821336 A | 9/2010 |
| CN | 102321362 A | 1/2012 |
| CN | 102558850 A | 7/2012 |
| CN | 202516545 U | 11/2012 |
| CN | 202538892 U | 11/2012 |
| CN | 202570325 U | 12/2012 |
| CN | 202613969 U | 12/2012 |
| CN | 202613970 U | 12/2012 |
| CN | 202630677 U | 12/2012 |
| CN | 102002218 B | 1/2013 |
| CN | 202639334 U | 1/2013 |
| CN | 103013101 A | 4/2013 |
| CN | 103351618 A | 10/2013 |
| CN | 103525041 A | 1/2014 |
| CN | 103756012 A | 4/2014 |
| CN | 103772972 B | 5/2014 |
| CN | 103865255 A | 6/2014 |
| CN | 102618026 B | 7/2014 |
| CN | 102164933 B | 12/2014 |
| CN | 103073881 B | 12/2014 |
| CN | 103086334 B | 12/2014 |
| CN | 104177824 A | 12/2014 |
| CN | 104262955 A | 1/2015 |
| CN | 103172671 B | 2/2015 |
| CN | 102453312 B | 3/2015 |
| CN | 103073879 B | 4/2015 |
| CN | 103172664 B | 4/2015 |
| CN | 103172665 B | 4/2015 |
| CN | 103102367 B | 7/2015 |
| CN | 104845297 A | 8/2015 |
| CN | 103073576 B | 9/2015 |
| CN | 103172663 B | 9/2015 |
| CN | 104059101 B | 9/2015 |
| CN | 103756011 B | 10/2015 |
| CN | 103923444 B | 10/2015 |
| CN | 104371143 B | 10/2015 |
| CN | 103073574 B | 11/2015 |
| CN | 103073575 B | 11/2015 |
| CN | 103073577 B | 11/2015 |
| CN | 105061500 A | 11/2015 |
| CN | 105062050 A | 11/2015 |
| CN | 103087097 B | 12/2015 |
| CN | 105111735 A | 12/2015 |
| CN | 103087098 B | 1/2016 |
| CN | 103172666 B | 3/2016 |
| CN | 103172667 B | 3/2016 |
| CN | 103772918 B | 3/2016 |
| CN | 105367823 A | 3/2016 |
| CN | 103534314 B | 4/2016 |
| CN | 103772972 B | 4/2016 |
| CN | 105908087 A | 8/2016 |
| CN | 105199145 B | 9/2016 |
| CN | 104004350 B | 2/2017 |
| CN | 106995618 A | 8/2017 |
| CN | 107057348 A | 8/2017 |
| CN | 104861205 B | 12/2017 |
| CN | 104861206 B | 12/2017 |
| CN | 104877177 B | 12/2017 |
| CN | 107629450 A | 1/2018 |
| CN | 107652596 A | 2/2018 |
| CN | 104804430 B | 3/2018 |
| CN | 105400179 B | 5/2018 |
| CN | 108148407 A | 6/2018 |
| CN | 108165004 A | 6/2018 |
| CN | 109265992 A | 1/2019 |
| CN | 109467922 A | 3/2019 |
| CN | 106519665 B | 4/2019 |
| CN | 109694568 A | 4/2019 |
| CN | 110183848 A | 8/2019 |
| CN | 110183849 A | 8/2019 |
| CN | 107033585 B | 3/2020 |
| EP | 1 544 240 A1 | 6/2005 |
| EP | 1 753 821 B1 | 10/2012 |
| EP | 2 443 192 B1 | 4/2013 |
| EP | 3 091 023 A1 | 11/2016 |
| EP | 3 214 118 A1 | 9/2017 |
| EP | 2 638 110 B1 | 6/2019 |

(56) References Cited

FOREIGN PATENT DOCUMENTS

| | | |
|---|---|---|
| EP | 3 517 566 A1 | 7/2019 |
| JP | H 1142674 A | 2/1999 |
| JP | H 11269360 A | 10/1999 |
| JP | H 11310691 A | 11/1999 |
| JP | 2000290479 A | 10/2000 |
| JP | 2001323171 A | 11/2001 |
| JP | 2004204194 A | 7/2004 |
| JP | 2004292532 A | 10/2004 |
| JP | 2005162913 A | 6/2005 |
| JP | 2007092038 A | 4/2007 |
| JP | 2007231094 A | 9/2007 |
| JP | 2010222570 A | 10/2010 |
| JP | 2011231338 A | 11/2011 |
| JP | 2012051954 A | 3/2012 |
| JP | 5224431 B2 | 7/2013 |
| JP | 2013203856 A | 7/2013 |
| JP | 2014024946 A | 2/2014 |
| JP | 2014043486 A | 3/2014 |
| JP | 2014152322 A | 8/2014 |
| JP | 2015028155 A | 2/2015 |
| JP | 2015110702 A | 6/2015 |
| JP | 5760319 B2 | 8/2015 |
| JP | 5800096 B2 | 10/2015 |
| JP | 2017002146 A | 1/2017 |
| JP | 2017088687 A | 5/2017 |
| JP | 2017115101 A | 6/2017 |
| JP | 6354379 B2 | 7/2018 |
| KR | 20040060386 A | 7/2004 |
| KR | 20040107603 A | 12/2004 |
| WO | WO 2007007663 A1 | 1/2007 |
| WO | WO 2013099522 A1 | 7/2013 |
| WO | WO 2014134872 A1 | 9/2014 |
| WO | WO 2014134874 A1 | 9/2014 |
| WO | WO 2014134875 A1 | 9/2014 |
| WO | WO 2015141708 A1 | 9/2015 |
| WO | WO 2017/082231 A1 | 5/2017 |
| WO | WO 2018092686 A1 | 5/2018 |
| WO | WO 2018105295 A1 | 6/2018 |
| WO | WO 2020/142029 A1 | 9/2020 |
| WO | WO 2020/184839 A1 | 9/2020 |

OTHER PUBLICATIONS

International Search Report and Written Opinion for PCT/IB2018/058065 dated May 7, 2019, 15 pages.

\* cited by examiner

FLAME RETARDANT POLYAMIDE COMPOSITION

RELATED APPLICATION

The present application claims priority to U.S. Application Ser. No. 62/573,285 (filed on Oct. 17, 2017), which is incorporated herein in its entirety by reference thereto.

BACKGROUND OF THE INVENTION

Electrical connectors are commonly used in household and industrial appliances to provide a connection between the product and an electrical circuit, or between different components within the product itself. Due to their small size and complex geometry, many of these electrical connectors are formed from polyamide compositions. Recently, the International Electrotechnical Commission (IEC) has adopted the ignition resistance in several electrical safety standards (IEC 60335-1 and the second parts of the same) to assess the safety of electrical end products. This comes to integrate the existing requirements of resistance to heat and fire for polyamide compositions and other resins used in components for appliances, when they are used as an insulating material. Applicable ignition and combustion resistance tests are described in the "glow wire" standards (IEC 60695-2/10/11/12/13). Because polyamide compounds, especially when reinforced with glass fibers, have a relative low degree of inherent ignition resistance, most conventional attempts in satisfying these glow wire standards have involved the addition of external halogen-based flame retardants (e.g., brominated compounds) to the polyamide composition. Unfortunately, however, the presence of halogens is not desired in most electrical applications due to environmental concerns when the composition is burned. While halogen-free flame retardants have been developed, the use of such materials in polyamide resins is typically associated with a corresponding adverse impact on the mechanical properties of the composition.

As such, a need currently exists for flame retardant polyamide compositions that can satisfy the IEC glow wire requirements without the need for halogen-based flame retardants, but still maintain good mechanical properties (e.g., similar to equivalent grades without flame retardants), as well as other properties, such as elevated CTI and good insulation properties.

SUMMARY OF THE INVENTION

In accordance with one embodiment of the present invention, a polyamide composition is disclosed that comprises a polyamide, a plurality of inorganic fibers, and a flame retardant system comprising a zinc phosphinate and a nitrogen-containing polyphosphate. At thicknesses of from about 0.4 to about 3.2 millimeters, the composition exhibits a Glow Wire Ignition Temperature of about 775° C. or more as determined in accordance with IEC-60695-2-13:2010; a Glow Wire End Product Temperature (without flame) of about 750° C. or more as determined in accordance with IEC-60335-1:2010; a Glow Wire Flammability Index of about 850° C. or more as determined in accordance with IEC-60695-2-12:2010; a V0 rating as determined in accordance with UL94; and/or a comparative tracking index of about 550 volts or more as determined in accordance with IEC 60112:2003.

In accordance with another embodiment of the present invention, an electrical connector that comprises opposing walls between which a passageway is defined for receiving a contact pin. At least one of the walls has a thickness of about 4 millimeters or less and contains a polyamide composition comprising a polyamide and glass fibers, wherein the composition exhibits a Glow Wire End Product Temperature (without flame) of about 750° C. or more as determined in accordance with IEC-60335-1:2010; a Glow Wire Ignition Temperature of about 775° C. or more as determined in accordance with IEC-60695-2-13:2010; a Glow Wire Flammability Index of about 850° C. or more as determined in accordance with IEC-60695-2-12:2010; a V0 rating as determined in accordance with UL94; and/or a comparative tracking index of about 550 volts or more as determined in accordance with IEC 60112:2003.

Other features and aspects of the present invention are set forth in greater detail below.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to a polyamide composition that contains at least one polyamide resin in combination with inorganic fibers and a flame retardant system that includes a zinc phosphinate and a nitrogen-containing polyphosphate. Typically, polyamides constitute from about 30 wt. % to about 80 wt. %, in some embodiments from about 35 wt. % to about 75 wt. %, and in some embodiments, from about 40 wt. % to about 70 wt. % of the composition. Inorganic fibers may constitute from about 5 wt. % to about 50 wt. %, in some embodiments from about 10 wt. % to about 40 wt. %, and in some embodiments, from about 15 wt. % to about 30 wt. % of the composition. Likewise, the flame retardant system typically constitutes from about 5 wt. % to about 40 wt. %, in some embodiments from about 10 wt. % to about 40 wt. %, and in some embodiments, from about 15 wt. % to about 35 wt. % of the polyamide composition.

Through selective control over the nature of these and relative concentration of these components, the present inventors have discovered that the resulting polyamide composition can achieve a unique combination of flame retardancy and good mechanical properties even when formed into a shape part having a relatively small thickness, such as about 4 millimeters or less, in some embodiments about from about 0.2 to about 3.2 millimeters or less, and in some embodiments, from about 0.4 to about 1.6 millimeters (e.g., 0.4 or 0.8 millimeters). As is known in the art, the flame retardancy of the composition can be characterized by glow wire testing. For example, during glow wire testing, the temperature at which the composition will ignite and burn for longer than 5 seconds when placed into contact with a heated test plate can be measured. This temperature is known as the Glow Wire Ignition Temperature ("GWIT") and is determined in accordance with IEC-60695-2-13:2010 at a part thickness such as noted above (e.g., from about 0.4 to about 3.2 millimeters). Generally speaking, the composition of the present invention can exhibit a GWIT of about 775° C. or more, in some embodiments about 800° C., and in some embodiments, about 825° C. or more. The flame retardancy of the composition can also be characterized by the highest temperature at which the material does not ignite or self-extinguish within 30 seconds after removal of the heated element during a glow wire test conducted in accordance with IEC-60695-2-12:2010 at a part thickness such as noted above (e.g., from about 0.4 to about 3.2 millimeters). This temperature is known as the Glow Wire Flammability Index ("GWFI") and is typically about 850° C. or more, in some embodiments about 875° C. or more, and in some embodiments, about 900° C. or more of the composition of the present invention. The composition may also exhibit a Glow Wire End Product Temperature ("GWEPT") (without flame) of about 750° C. or more, in some embodiments about 775° C. or more, and in some embodiments, about 800° C. or more as determined in accordance with IEC-60335-1:2010 for a standard part (e.g., terminal block/connector) having a thickness such as noted above (e.g., from about 0.4 to about 3.2 millimeters). The part may be tested in more than one position (e.g., position 1, 2, or 3) if desired, which may be based on the position of the internal live connections.

In addition to the glow wire test, the flammability of the composition of the present invention can also be characterized in accordance the procedure of Underwriter's Laboratory Bulletin 94 entitled "Tests for Flammability of Plastic Materials, UL94." Several ratings can be applied based on the time to extinguish ((total flame time of a set of 5 specimens) and ability to resist dripping as described in more detail below. According to this procedure, for example, the composition may exhibit a V0 rating at a part thickness such as noted above (e.g., from about 0.4 to about 3.2 millimeters), which means that it has a total flame time of about 50 seconds or less. To achieve a V0 rating, the composition may also exhibit a total number of drips of burning particles that ignite cotton of 0. The composition of the present invention may also exhibit a comparative tracking index ("CTI") that is relatively high when determined in accordance with IEC 60112:2003 at a part thickness such as noted above. For example, the composition may exhibit a CTI that is about 550 volts or more, in some embodiments about 575 volts or more, in some embodiments about 600 volts or more, and in some embodiments, about 625 volts or more.

Conventionally, it was believed that compositions having flame retardant properties could not achieve the desired mechanical properties for various applications. The present inventors have discovered, however, that the composition of the present invention can still achieve good impact strength, tensile properties, and flexural properties. For example, the polyamide composition may exhibit a Charpy unnotched impact strength of about 5 kJ/m$^2$ or more, in some embodiments about 6 kJ/m$^2$ or more, in some embodiments from about 7 to about 30 kJ/m$^2$, and in some embodiments, from about 8 to about 25 kJ/m$^2$, measured at 23° C. or −30° C. according to ISO Test No. 179-1:2010 (technically equivalent to ASTM D256-10, Method B). The composition may also exhibit a tensile strength of about 40 Megapascals ("MPa") or more, in some embodiments about 50 MPa or more, in some embodiments from about 55 to about 200 MPa, and in some embodiments, from about 60 to about 150 MPa, as well as a tensile modulus of about 7,000 MPa or more, in some embodiments about 8,000 MPa or more, in some embodiments about 9,000 MPa or more, in some embodiments from about 11,000 to about 50,000 MPa, and in some embodiments, from about 12,000 to about 25,000 MPa, wherein the tensile properties are determined in accordance with ISO Test No. 527:2012 (technically equivalent to ASTM D638-14 at 23° C. The composition may also exhibit a flexural strength of from about 70 to about 500 MPa, in some embodiments from about 80 to about 400 MPa, and in some embodiments from about 90 to about 300 MPa and/or a flexural modulus of from about 10,000 MPa to about 30,000 MPa, in some embodiments from about 12,000 MPa to about 25,000 MPa, and in some embodiments, from about 14,000 MPa to about 20,000 MPa. The flexural properties may be determined in accordance with ISO Test No. 178: 2010 (technically equivalent to ASTM D790-10) at 23° C.

Various embodiments of the present invention will now be described in more detail.

I. Polyamide Composition

A. Polyamide

Polyamides generally have a CO—NH linkage in the main chain and are obtained by condensation of a diamine and a dicarboxylic acid, by ring opening polymerization of lactam, or self-condensation of an amino carboxylic acid. For example, the polyamide may contain aliphatic repeating units derived from an aliphatic diamine, which typically has from 4 to 14 carbon atoms. Examples of such diamines include linear aliphatic alkylenediamines, such as 1,4-tetramethylenediamine, 1,6-hexanediamine, 1,7-heptanediamine, 1,8-octanediamine, 1,9-nonanediamine, 1,10-decanediamine, 1,11-undecanediamine, 1,12-dodecanediamine, etc.; branched aliphatic alkylenediamines, such as 2-methyl-1,5-pentanediamine, 3-methyl-1,5 pentanediamine, 2,2,4-trimethyl-1,6-hexanediamine, 2,4,4-trimethyl-1,6-hexanediamine, 2,4-dimethyl-1,6-hexanediamine, 2-methyl-1,8-octanediamine, 5-methyl-1,9-nonanediamine, etc.; as well as combinations thereof. Of course, aromatic and/or alicyclic diamines may also be employed. Furthermore, examples of the dicarboxylic acid component may include aromatic dicarboxylic acids (e.g., terephthalic acid, isophthalic acid, 2,6-naphthalenedicarboxylic acid, 2,7-naphthalenedicarboxylic acid, 1,4-naphthalenedicarboxylic acid, 1,4-phenylenedioxy-diacetic acid, 1,3-phenylenedioxy-diacetic acid, diphenic acid, 4,4'-oxydibenzoic acid, diphenylmethane-4,4'-dicarboxylic acid, diphenylsulfone-4,4'-dicarboxylic acid, 4,4'-biphenyldicarboxylic acid, etc.), aliphatic dicarboxylic acids (e.g., adipic acid, sebacic acid, etc.), and so forth. Examples of lactams include pyrrolidone, aminocaproic acid, caprolactam, undecanlactam, lauryl lactam, and so forth. Likewise, examples of amino carboxylic acids include amino fatty acids, which are compounds of the aforementioned lactams that have been ring opened by water.

In certain embodiments, an "aliphatic" polyamide is employed that is formed only from aliphatic monomer units (e.g., diamine and dicarboxylic acid monomer units). Particular examples of such aliphatic polyamides include, for instance, nylon-4 (poly-α-pyrrolidone), nylon-6 (polycaproamide), nylon-11 (polyundecanamide), nylon-12 (polydodecanamide), nylon-46 (polytetramethylene adipamide), nylon-66 (polyhexamethylene adipamide), nylon-610, and nylon-612. Nylon-6 and nylon-66 are particularly suitable. Of course, it is also possible to include aromatic monomer units in the polyamide such that it is considered semi-aromatic (contains both aliphatic and aromatic monomer units) or wholly aromatic (contains only aromatic monomer units). For instance, suitable semi-aromatic polyamides may include poly(nonamethylene terephthalamide) (PA9T), poly(nonamethylene terephthalamide/nonamethylene decanediamide) (PA9T/910), poly(nonamethylene terephthalamide/nonamethylene dodecanediamide) (PA9T/912), poly(nonamethylene terephthalamide/11-aminoundecanamide) (PA9T/11), poly(nonamethylene terephthalamide/12-aminododecanamide) (PA9T/12), poly(decamethylene terephthalamide/11-aminoundecanamide) (PA10T/11), poly(decamethylene terephthalamide/12-aminododecanamide) (PA10T/12), poly(decamethylene terephthalamide/decamethylene decanediamide) (PA10T/1010), poly(decamethylene terephthalamide/decamethylene dodecanediamide) (PA10T/1012), poly(decamethylene terephthalamide/tetramethylene hexanediamide) (PA10T/46), poly(decamethylene terephthalamide/caprolactam) (PA10T/6), poly(decamethylene terephthalamide/hexamethylene hexanediamide) (PA10T/66), poly(dodecamethylene terephthalamide/dodecamethylene dodecanediamide) (PA12T/1212), poly(dodecamethylene terephthalamide/caprolactam) (PA12T/6), poly(dodecamethylene terephthalamide/hexamethylene hexanediamide) (PA12T/66), and so forth.

The polyamide employed in the polyamide composition is typically crystalline or semi-crystalline in nature and thus has a measurable melting temperature. The melting temperature may be relatively high such that the composition can provide a substantial degree of heat resistance to a resulting part. For example, the polyamide may have a melting temperature of about 220° C. or more, in some embodiments from about 240° C. to about 325° C., and in some embodiments, from about 250° C. to about 335° C. The polyamide may also have a relatively high glass transition temperature, such as about 30° C. or more, in some embodiments about 40° C. or more, and in some embodiments, from about 45° C. to about 140° C. The glass transition and melting temperatures may be determined as is well known in the art using differential scanning calorimetry ("DSC"), such as determined by ISO Test No. 11357-2:2013 (glass transition) and 11357-3:2011 (melting).

B. Inorganic Fibers

The inorganic fibers generally have a high degree of tensile strength relative to their mass. For example, the ultimate tensile strength of the fibers (determined in accordance with ASTM D2101) is typically from about 1,000 to about 15,000 MPa, in some embodiments from about 2,000 MPa to about 10,000 MPa, and in some embodiments, from about 3,000 MPa to about 6,000 MPa. The high strength fibers may be formed from materials that are also electrically insulative in nature, such as glass, ceramics (e.g., alumina or silica), etc., as well as mixtures thereof. Glass fibers are particularly suitable, such as E-glass, A-glass, C-glass, D-glass, AR-glass, R-glass, S1-glass, S2-glass, etc., and mixtures thereof. The inorganic fibers may have a relatively small median diameter, such as about 50 micrometers or less, in some embodiments from about 0.1 to about 40 micrometers, and in some embodiments, from about 2 to about 20 micrometers, such as determined using laser diffraction techniques in accordance with ISO 13320:2009 (e.g., with a Horiba LA-960 particle size distribution analyzer). It is believed that the small diameter of such fibers can allow their length to be more readily reduced during melt blending, which can further improve surface appearance and mechanical properties. After formation of the polymer composition, for example, the average length of the inorganic fibers may be relatively small, such as from about 10 to about 800 micrometers, in some embodiments from about 100 to about 700 micrometers, and in some embodiments, from about 200 to about 600 micrometers. The inorganic fibers may also have a relatively high aspect ratio (average length divided by nominal diameter), such as from about 1 to about 100, in some embodiments from about 10 to about 60, and in some embodiments, from about 30 to about 50.

C. Flame Retardant System

In addition to the components above, the polyamide composition also contains a flame retardant system that is capable of achieving the desired flammability performance, smoke suppression, and mechanical properties without the need for conventional halogen-based flame retardants. Consequently, the flame retardant system includes at least one low halogen flame retardant. The halogen (e.g., bromine, chlorine, and/or fluorine) content of such an agent is about 1,500 parts per million by weight ("ppm") or less, in some embodiments about 900 ppm or less, and in some embodiments, about 50 ppm or less. In certain embodiments, the flame retardants are complete free of halogens (i.e., 0 ppm).

In this regard, the flame retardant system includes a zinc phosphinate as one type of a halogen-free flame retardant. Without intending to be limited by theory, it is believed that the use of a zinc salt can enhance the flame retardancy of the overall composition, particularly for relatively thin parts. Such zinc phosphinates typically constitute from about 10 wt. % to about 55 wt. %, in some embodiments from about 20 wt. % to about 54 wt. %, and in some embodiments, from about 30 wt. % to about 52 wt. % of the flame retardant system, and also from about 0.5 wt. % to about 15 wt. %, in some embodiments from about 1 wt. % to about 14 wt. %, and in some embodiments, from about 5 wt. % to about 13 wt. % of the entire polyamide composition. One example of such a zinc phosphinate is a salt of a phosphinic acid and/or diphosphinic acid having the general formula (I) and/or formula (II):

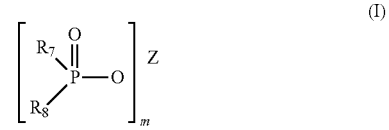

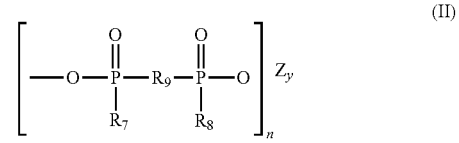

wherein, $R_7$ and $R_8$ are, independently, hydrogen or substituted or unsubstituted, straight chain, branched, or cyclic hydrocarbon groups (e.g., alkyl, alkenyl, alkylnyl, aralkyl, aryl, alkaryl, etc.) having 1 to 6 carbon atoms, particularly alkyl groups having 1 to 4 carbon atoms, such as methyl, ethyl, n-propyl, iso-propyl, n-butyl, or tert-butyl groups;

$R_9$ is a substituted or unsubstituted, straight chain, branched, or cyclic $C_1$-$C_{10}$ alkylene, arylene, arylalkylene, or alkylarylene group, such as a methylene, ethylene, n-propylene, iso-propylene, n-butylene, tert-butylene, n-pentylene, n-octylene, n-dodecylene, phenylene, naphthylene, methylphenylene, ethylphenylene, tert-butylphenylene, methylnaphthylene, ethylnaphthylene, t-butylnaphthylene, phenylethylene, phenylpropylene or phenylbutylene group;

Z is zinc;

y and n are 1; and m is 2.

The zinc phosphinates may be prepared using any known technique, such as by reacting a phosphinic acid with a zinc carbonate, zinc hydroxide or metal oxides in aqueous solution. Particularly suitable phosphinates include, for example, zinc salts of dimethylphosphinic acid, ethylmethylphosphinic acid, diethylphosphinic acid, methyl-n-propylphosphinic acid, methane-di(methylphosphonic acid), ethane-1,2-di(methylphosphinic acid), hexane-1,6-di(methylphosphinic acid), benzene-1,4-di(methylphosphinic acid), methylphenylphosphinic acid, diphenylphosphinic acid, hypophosphoric acid, etc. The resulting salts are typically monomeric compounds; however, polymeric phosphinates may also be formed. One particularly suitable zinc phosphinate is zinc diethylphosphinate, such as commercially available from Clariant under the name EXOLIT® OP 950.

In addition to a zinc phosphinate, the flame retardant system also contains a nitrogen-containing polyphosphate, which is also halogen-free. Such nitrogen-containing polyphosphates typically constitute from about 30 wt. % to about 80 wt. %, in some embodiments from about 40 wt. % to about 70 wt. %, and in some embodiments, from about 45 wt. % to about 65 wt. % of the flame retardant system, and also from about 1 wt. % to about 30 wt. %, in some embodiments from about 2 wt. % to about 25 wt. %, and in some embodiments, from about 5 wt. % to about 20 wt. % of the entire polyamide composition. One example of such a polyphosphate has the following general formula:

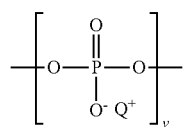

v is from 1 to 1000, in some embodiments from 2 to 500, in some embodiments from 3 to 100, and in some embodiments, from 5 to 50; and Q is a nitrogen base.

Suitable nitrogen bases may include those having a substituted or unsubstituted ring structure, along with at least one nitrogen heteroatom in the ring structure (e.g., heterocyclic or heteroaryl group) and/or at least one nitrogen-containing functional group (e.g., amino, acylamino, etc.) substituted at a carbon atom and/or a heteroatom of the ring structure. Examples of such heterocyclic groups may include, for instance, pyrrolidine, imidazoline, pyrazolidine, oxazolidine, isoxazolidine, thiazolidine, isothiazolidine, piperidine, piperazine, thiomorpholine, etc. Likewise, examples of heteroaryl groups may include, for instance, pyrrole, imidazole, pyrazole, oxazole, isoxazole, thiazole, isothiazole, triazole, furazan, oxadiazole, tetrazole, pyridine, diazine, oxazine, triazine, tetrazine, and so forth. If desired, the ring structure of the base may also be substituted with one or more functional groups, such as acyl, acyloxy, acylamino, alkoxy, alkenyl, alkyl, amino, aryl, aryloxy, carboxyl, carboxyl ester, cycloalkyl, hydroxyl, halo, haloalkyl, heteroaryl, heterocyclyl, etc. Substitution may occur at a heteroatom and/or a carbon atom of the ring structure. For instance, one suitable nitrogen base may be a triazine in which one or more of the carbon atoms in the ring structure are substituted by an amino group. One particularly suitable base is melamine, which contains three carbon atoms in the ring structure substituted with an amino functional group. Such bases may form a melamine polyphosphate, such as those commercially available from BASF under the name MELAPUR® (e.g., MELAPUR® 200 or 200/70).

In certain embodiments of the present invention, the flame retardant system may be formed entirely of zinc phosphinates and nitrogen-containing polyphosphates, such as those described above. In certain embodiments, however, it may be desired to employ additional compounds to help increase the effectiveness of the system. For example, inorganic compounds may be employed as low halogen char-forming agents and/or smoke suppressants in combination with an organophosphorous compound. Suitable inorganic compounds (anhydrous or hydrates) may include, for instance, inorganic molybdates, such as zinc molybdate (e.g., commercially available under the designation Kemgard® from Huber Engineered Materials), calcium molybdate, ammonium octamolybdate, zinc molybdate-magnesium silicate, etc. Other suitable inorganic compounds may include inorganic borates, such as zinc borate (commercially available under the designation Firebrake® from Rio Tento Minerals), etc.); zinc phosphate, zinc hydrogen phosphate, zinc pyrophosphate, basic zinc chromate (VI) (zinc yellow), zinc chromite, zinc permanganate, silica, magnesium silicate, calcium silicate, calcium carbonate, titanium dioxide, magnesium dihydroxide, and so forth. In particular embodiments, it may be desired to use an inorganic zinc compound, such as zinc molybdate, zinc borate, etc., to enhance the overall performance of the composition. When employed, such inorganic compounds (e.g., zinc borate) may, for example, constitute from about 1 wt. % to about 20 wt. %, in some embodiments from about 2 wt. % to about 15 wt. %, and in some embodiments, from about 3 wt. % to about 10 wt. % of the flame retardant system, and also from about 0.1 wt. % to about 10 wt. %, in some embodiments from about 0.2 wt. % to about 5 wt. %, and in some embodiments, from about 0.5 wt. % to about 4 wt. % of the entire polyamide composition.

If desired, other additives may also be employed in the flame retardant system of the present invention. For instance, nitrogen-containing synergists may be employed that act in conjunction with the zinc phosphinate and/or other components to result in a more effective flame retardant system. Such nitrogen-containing synergists may include those of the formulae (III) to (VIII), or a mixture of thereof:

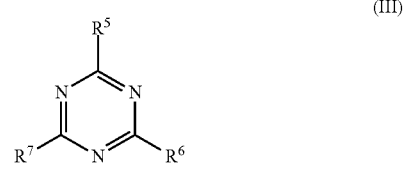
(III)

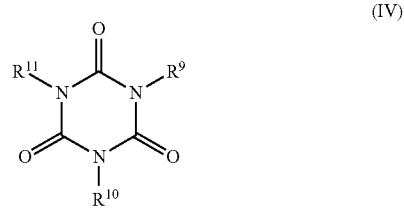
(IV)

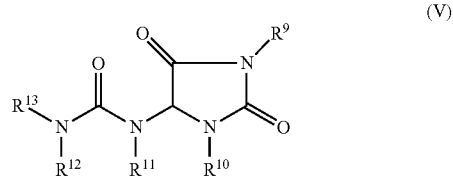
(V)

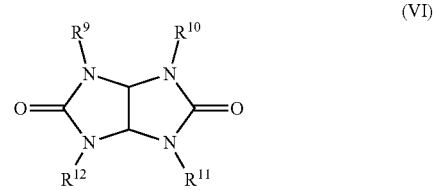
(VI)

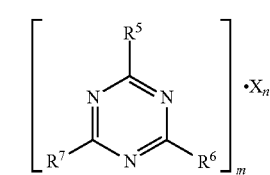
(VII)

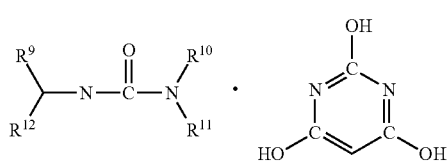
(VIII)

wherein, $R_5$, $R_6$, $R_7$, $R_9$, $R_{10}$, $R_{11}$, $R_{12}$, and $R_{13}$ are, independently, hydrogen; $C_1$-$C_8$ alkyl; $C_5$-$C_{16}$-cycloalkyl or alkylcycloalkyl, optionally substituted with a hydroxy or a $C_1$-$C_4$ hydroxyalkyl; $C_2$-$C_8$ alkenyl; $C_1$-$C_8$ alkoxy, acyl, or acyloxy; $C_6$-$C_{12}$-aryl or arylalkyl; $OR^8$ or $N(R^8)R^9$, wherein $R^8$ is hydrogen, $C_1$-$C_8$ alkyl, $C_5$-$C_{16}$ cycloalkyl or alkylcycloalkyl, optionally substituted with a hydroxy or a $C_1$-$C_4$ hydroxyalkyl, $C_2$-$C_8$ alkenyl, $C_1$-$C_8$ alkoxy, acyl, or acyloxy, or $C_6$-$C_{12}$ aryl or arylalkyl;

m is from 1 to 4;

n is from 1 to 4;

X is an acid that can form adducts with triazine compounds of the formula III. For example, the nitrogen-containing synergist may include benzoguanamine, tris(hydroxyethyl) isocyanurate, allantoin, glycoluril, melamine, melamine cyanurate, dicyandiamide, guanidine, etc. Examples of such synergists are described in U.S. Pat. No. 6,365,071 to Jenewein, et al.; U.S. Pat. No. 7,255,814 to Hoerold, et al.; and U.S. Pat. No. 7,259,200 to Bauer, et al. One particularly suitable synergist is melamine cyanurate, such as commercially available from BASF under the name MELAPUR® MC (e.g., MELAPUR® MC 15, MC25, MC50).

When employed, nitrogen-containing synergists may, for example, constitute about from about 0.5 wt. % to about 30 wt. %, in some embodiments from about 1 wt. % to about 25 wt. %, and in some embodiments, from about 2 wt. % to about 20 wt. % of the flame retardant system, and also from about 0.1 wt. % to about 10 wt. %, in some embodiments from about 0.5 wt. % to about 8 wt. %, and in some embodiments, from about 1 wt. % to about 6 wt. % of the entire polyamide composition.

Yet another suitable flame retardant additive that may be employed in the polyamide composition is an aromatic compound. Without intending to be limited by theory, the present inventors have discovered that the use of such compounds can reduce the overall flammability of the composition. Suitable aromatic compounds may, for instance, include those having the following general structure Formula (IX):

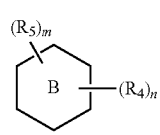
(IX)

or a metal salt thereof, wherein, ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;

$R_4$ is OH or COOH;

$R_5$ is acyl, acyloxy (e.g., acetyloxy), acylamino (e.g., acetylamino), alkoxy, alkenyl, alkyl, amino, aryl, aryloxy, carboxyl, carboxyl ester, cycloalkyl, cycloalkyloxy, hydroxyl, halo, haloalkyl, heteroaryl, heteroaryloxy, heterocyclyl, or heterocycloxy;

m is from 0 to 4, in some embodiments from 0 to 2, and in some embodiments, from 0 to 1; and n is from 1 to 3, and in some embodiments, from 1 to 2. When the compound is in the form of a metal salt, suitable metal counterions may include transition metal counterions (e.g., copper, iron, etc.), alkali metal counterions (e.g., potassium, sodium, etc.), alkaline earth metal counterions (e.g., calcium, magnesium, etc.), and/or main group metal counterions (e.g., aluminum).

In one embodiment, for example, B is phenyl in Formula (IX) such that the resulting phenolic compounds have the following general formula (X):

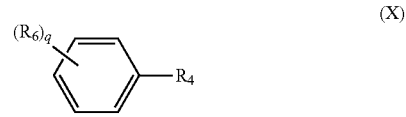
(X)

or a metal salt thereof, wherein, $R_4$ is OH or COOH;

$R_6$ is acyl, acyloxy, acylamino, alkoxy, alkenyl, alkyl, amino, carboxyl, carboxyl ester, hydroxyl, halo, or haloalkyl; and q is from 0 to 10, in some embodiments from 0 to 4, and in some embodiments, from 0 to 2. Particular examples of such phenolic compounds include, for instance, benzoic acid ($R_4$ is COOH and q is 0); 4-hydroxybenzoic acid ($R_4$ is COOH, $R_6$ is OH, and q is 1); phthalic acid ($R_4$ is COOH, $R_6$ is COOH, and q is 1); isophthalic acid ($R_4$ is COOH, $R_6$ is COOH, and q is 1); terephthalic acid ($R_4$ is COOH, $R_6$ is COOH, and q is 1); 2-methylterephthalic acid ($R_4$ is COOH, $R_6$ is COOH, and $CH_3$ and q is 2); 4-hydroxybenzoic acid ($R_4$ is OH, $R_6$ is C(O)OH, and q is 1), etc., as well as combinations thereof.

When employed, such aromatic compounds may constitute about from about 1 wt. % to about 25 wt. %, in some embodiments from about 2 wt. % to about 20 wt. %, and in some embodiments, from about 4 wt. % to about 15 wt. % of the flame retardant system, and also from about 0.1 wt. % to about 10 wt. %, in some embodiments from about 0.2 wt. % to about 8 wt. %, and in some embodiments, from about 0.5 wt. % to about 5 wt. % of the entire polyamide composition.

The flame retardant system and/or the polyamide composition itself generally has a relatively low content of halogens (i.e., bromine, fluorine, and/or chlorine), such as about 15,000 parts per million ("ppm") or less, in some embodiments about 5,000 ppm or less, in some embodiments about 1,000 ppm or less, in some embodiments about 800 ppm or less, and in some embodiments, from about 1 ppm to about 600 ppm. Nevertheless, in certain embodiments of the present invention, halogen-based flame retardants may still be employed as an optional component.

Particularly suitable halogen-based flame retardants are fluoropolymers, such as polytetrafluoroethylene (PTFE), fluorinated ethylene polypropylene (FEP) copolymers, perfluoroalkoxy (PFA) resins, polychlorotrifluoroethylene (PCTFE) copolymers, ethylene-chlorotrifluoroethylene (ECTFE) copolymers, ethylene-tetrafluoroethylene (ETFE) copolymers, polyvinylidene fluoride (PVDF), polyvinylfluoride (PVF), and copolymers and blends and other combination thereof. When employed, such halogen-based flame retardants typically constitute only about 10 wt. % or less, in some embodiments about 5 wt. % or less, and in some embodiments, about 1 wt. % or less of the flame retardant system. Likewise, the halogen-based flame retardants typically constitute about 5 wt. % or less, in some embodiments about 1 wt. % or less, and in some embodiments, about 0.5 wt. % or less of the entire polyamide composition.

D. Other Components

A wide variety of additional additives can also be included in the polyamide composition, such as impact modifiers, compatibilizers, particulate fillers (e.g., mineral fillers), lubricants, pigments, antioxidants, light stabilizers, heat stabilizers, and/or other materials added to enhance properties and processability. In certain embodiments, for example, the composition may contain a UV stabilizer. Suitable UV stabilizers may include, for instance, benzophenones, benzotriazoles (e.g., 2-(2-hydroxy-3,5-di-α-cumylphenyl)-2H-benzotriazole (TINUVIN® 234), 2-(2-hydroxy-5-tert-octylphenyl)-2H-benzotriazole (TINUVIN® 329), 2-(2-hydroxy-3-α-cumyl-5-tert-octylphenyl)-2H-benzotriazole (TINUVIN® 928), etc.), triazines (e.g., 2,4-diphenyl-6-(2-hydroxy-4-hexyloxyphenyl)-s-triazine (TINUVIN® 1577)), sterically hindered amines (e.g., bis(2,2,6,6-tetramethyl-4-piperidyl)sebacate (TINUVIN® 770) or a polymer of dimethyl succinate and 1-(2-hydroxyethyl)-4-hydroxy-2,2,6,6-tetramethyl-4-piperidine (TINUVIN®622)), and so forth, as well as mixtures thereof. When employed, such UV stabilizers typically constitute from about 0.05 wt. % to about 2 wt. % in some embodiments from about 0.1 wt. % to about 1.5 wt. %, and in some embodiments, from about 0.2 wt. % to about 1.0 wt. % of the composition.

II. Formation

The polyamide, inorganic fibers, flame retardant system, and other optional additives may be melt processed or blended together. The components may be supplied separately or in combination to an extruder that includes at least one screw rotatably mounted and received within a barrel (e.g., cylindrical barrel) and may define a feed section and a melting section located downstream from the feed section along the length of the screw. The fibers may optionally be added a location downstream from the point at which the polyamide is supplied (e.g., hopper). If desired, the flame retardant(s) may also be added to the extruder a location downstream from the point at which the polyamide is supplied. One or more of the sections of the extruder are typically heated, such as within a temperature range of from about 200° C. to about 450° C., in some embodiments, from about 220° C. to about 350° C., and in some embodiments, from about 250° C. to about 350° C. to form the composition. The speed of the screw may be selected to achieve the desired residence time, shear rate, melt processing temperature, etc. For example, the screw speed may range from about 50 to about 800 revolutions per minute ("rpm"), in some embodiments from about 70 to about 150 rpm, and in some embodiments, from about 80 to about 120 rpm. The apparent shear rate during melt blending may also range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows.

Regardless of the particular manner in which it is formed, the resulting polyamide composition can possess excellent thermal properties. For example, the melt viscosity of the polyamide composition may be low enough so that it can readily flow into the cavity of a mold having small dimensions. In one particular embodiment, the polyamide composition may have a melt viscosity of from about 400 to about 1,000 Pascal-seconds ("Pa-s"), in some embodiments from about 450 to about 900 Pa-s, and in some embodiments, from about 500 to about 800 Pa-s, determined at a shear rate of 1000 seconds$^{-1}$. Melt viscosity may be determined in accordance with ISO Test No. 11443:2005 at a temperature that is 15° C. higher than the melting temperature of the composition (e.g., 285° C.).

III. Shaped Parts

Shaped parts may be formed from the polyamide composition using a variety of different techniques. Suitable techniques may include, for instance, injection molding, low-pressure injection molding, extrusion compression molding, gas injection molding, foam injection molding, low-pressure gas injection molding, low-pressure foam injection molding, gas extrusion compression molding, foam extrusion compression molding, extrusion molding, foam extrusion molding, compression molding, foam compression molding, gas compression molding, etc. For example, an injection molding system may be employed that includes a mold within which the polyamide composition may be injected. The time inside the injector may be controlled and optimized so that polymer matrix is not pre-solidified. When the cycle time is reached and the barrel is full for discharge, a piston may be used to inject the composition to the mold cavity. Compression molding systems may also be employed. As with injection molding, the shaping of the polyamide composition into the desired article also occurs within a mold. The composition may be placed into the compression mold using any known technique, such as by being picked up by an automated robot arm. The temperature of the mold may be maintained at or above the solidification temperature of the polymer matrix for a desired time period to allow for solidification. The molded product may then be solidified by bringing it to a temperature below that of the melting temperature. The resulting product may be de-molded. The cycle time for each molding process may be adjusted to suit the polymer matrix, to achieve sufficient bonding, and to enhance overall process productivity.

Regardless of the shaping technique employed, a wide variety of parts may be formed from the polyamide composition of the present invention. For example, the present inventors have discovered that the polyamide composition is particularly suitable for use in electrical connectors, such as those employed in household appliances. The connector may contain insertion passageways that are configured to receive contact pins. These passageways are defined by opposing walls, which may be formed from the polyamide composition of the present invention. The walls may have a width of from about 500 micrometers or less, in some embodiments from about 100 to about 450 micrometers, and in some embodiments, from about 200 to about 400 micrometers.

The present invention may be better understood with reference to the following examples.

Test Methods

Tensile Modulus, Tensile Stress, and Tensile Elongation at Break Tensile properties may be tested according to ISO Test No. 527:2012 (technically equivalent to ASTM D638-14). Modulus and strength measurements may be made on the same test strip sample having a length of 80 mm, thickness of 10 mm, and width of 4 mm. The testing temperature may be 23° C., and the testing speeds may be 1 or 5 mm/min.

Flexural Modulus and Flexural Stress: Flexural properties may be tested according to ISO Test No. 178:2010 (technically equivalent to ASTM D790-10). This test may be performed on a 64 mm support span. Tests may be run on the center portions of uncut ISO 3167 multi-purpose bars. The testing temperature may be 23° C. and the testing speed may be 2 mm/min.

Unnotched Charpy Impact Strength: Unnotched Charpy properties may be tested according to ISO Test No. ISO 179-1:2010) (technically equivalent to ASTM D256-10, Method B). This test may be run using a Type 1 specimen size (length of 80 mm, width of 10 mm, and thickness of 4 mm). Specimens may be cut from the center of a multi-purpose bar using a single tooth milling machine. The testing temperature may be 23° C.

Notched Charpy Impact Strength: Notched Charpy properties may be tested according to ISO Test No. ISO 179-1: 2010) (technically equivalent to ASTM D256-10, Method B). This test may be run using a Type A notch (0.25 mm base radius) and Type 1 specimen size (length of 80 mm, width of 10 mm, and thickness of 4 mm). Specimens may be cut from the center of a multi-purpose bar using a single tooth milling machine. The testing temperature may be 23° C. or −30° C.

Comparative Tracking Index ("CTI"): The comparative tracking index (CTI) may be determined in accordance with International Standard IEC 60112-2003 to provide a quantitative indication of the ability of a composition to perform as an electrical insulating material under wet and/or contaminated conditions. In determining the CTI rating of a composition, two electrodes are placed on a molded test specimen. A voltage differential is then established between the electrodes while a 0.1% aqueous ammonium chloride solution is dropped onto a test specimen. The maximum voltage at which five (5) specimens withstand the test period for 50 drops without failure is determined. The test voltages range from 100 to 600 V in 25 V increments. The numerical value of the voltage that causes failure with the application of fifty (50) drops of the electrolyte is the "comparative tracking index." The value provides an indication of the relative track resistance of the material. An equivalent method for determining the CTI is ASTM D-3638-12.

UL94: A specimen is supported in a vertical position and a flame is applied to the bottom of the specimen. The flame is applied for ten (10) seconds and then removed until flaming stops, at which time the flame is reapplied for another ten (10) seconds and then removed. Two (2) sets of five (5) specimens are tested. The sample size is a length of 125 mm, width of 13 mm, and thickness of 0.8 mm. The two sets are conditioned before and after aging. For unaged testing, each thickness is tested after conditioning for 48 hours at 23° C. and 50% relative humidity. For aged testing, five (5) samples of each thickness are tested after conditioning for 7 days at 70° C.

| Vertical Ratings | Requirements |
|---|---|
| V-0 | Specimens must not burn with flaming combustion for more than 10 seconds after either test flame application. Total flaming combustion time must not exceed 50 seconds for each set of 5 specimens. Specimens must not burn with flaming or glowing combustion up to the specimen holding clamp. Specimens must not drip flaming particles that ignite the cotton. No specimen can have glowing combustion remain for longer than 30 seconds after removal of the test flame. |
| V-1 | Specimens must not burn with flaming combustion for more than 30 seconds after either test flame application. Total flaming combustion time must not exceed 250 seconds for each set of 5 specimens. Specimens must not burn with flaming or glowing combustion up to the specimen holding clamp. Specimens must not drip flaming particles that ignite the cotton. No specimen can have glowing combustion remain for longer than 60 seconds after removal of the test flame. |
| V-2 | Specimens must not burn with flaming combustion for more than 30 seconds after either test flame application. Total flaming combustion time must not exceed 250 seconds for each set of 5 specimens. Specimens must not burn with flaming or glowing combustion up to the specimen holding clamp. Specimens can drip flaming particles that ignite the cotton. No specimen can have glowing combustion remain for longer than 60 seconds after removal of the test flame. |

Examples 1-6

Six (6) different polyamide resin samples are formed from the following components:

| | Ex. 1 (wt. %) | Ex. 2 (wt. %) | Ex. 3 (wt. %) | Ex. 4 (wt. %) | Ex. 5 (wt. %) | Ex. 6 (wt. %) |
|---|---|---|---|---|---|---|
| Nylon 6.6 | 42 | 44 | 43 | 42 | 43 | 39 |
| Nylon 6 | 11 | 10 | 10 | 10 | 10 | 10 |
| Glass Fibers | 25 | 25 | 25 | 25 | 25 | 25 |
| Dehydrated Zinc Borate (Firebrake ® 500) | 1 | 1 | 1 | 1 | 2 | 1 |
| Melamine Pyrophosphate | 7 | 11.3 | 11.3 | 11.3 | 11.3 | 14.1 |
| Zinc Phosphinate (Exolit ® OP 950) | — | 8.7 | 8.7 | 8.7 | 8.7 | 10.9 |
| Aluminum Phosphinate (Exolit ® OP 1312) | 14 | — | — | — | — | — |
| Terephthalic Acid | — | — | 1 | 2 | — | — |

The samples of Examples 1-6 were tested for various properties as described above. The results are set forth below.

| | Ex. 1 | Ex. 2 | Ex. 3 | Ex. 4 | Ex. 5 | Ex. 6 |
|---|---|---|---|---|---|---|
| UL94 0.4 mm | V0 | V2 | V0/V2 | V0 | V2 | V0 |
| UL94 0.8 mm | V0 | V0 | V0 | V0 | V0 | V0 |
| UL94 1.6 mm | V0 | V0 | V0 | V0 | V0 | V0 |
| GWIT (0.4 mm) | 750 | 825 | 800 | 825 | 800 | 825 |

|  | Ex. 1 | Ex. 2 | Ex. 3 | Ex. 4 | Ex. 5 | Ex. 6 |
|---|---|---|---|---|---|---|
| GWIT (0.8 mm) | 775 | 800 | 775 | 800 | 775 | 800 |
| GWIT (1.5 mm) | 775 | 800 | 800 | 800 | 800 | 800 |
| GWIT (3.0 mm) | 800 | 775 | 800 | 775 | 800 | 825 |
| GWFI (0.4-3.0 mm) | >850 | >850 | >850 | >850 | >850 | >850 |
| CTI (3.0 mm) | 600 | 600 | 600 | 600 | 600 | 600 |

Examples 7-14

Eight (8) different polyamide resin samples are formed using a co-rotating twin-screw extruder (ZSK40 by Coperion) having a standard screw design. The extruder is equipped with a "weight loss" multi-feeder system, with the option to add the components from the main hopper and downstream. The temperatures of the barrel and the die head are between 270 to 290° C., the melt temperature is below 300° C., and the throughput range is 80 to 120 kilograms per hour. The components of each formulation are set forth in more detail below.

|  | Ex. 7 (wt. %) | Ex. 8 (wt. %) | Ex. 9 (wt. %) | Ex. 10 (wt. %) | Ex. 11 (wt. %) | Ex. 12 (wt. %) | Ex. 13 (wt. %) | Ex. 14 (wt. %) |
|---|---|---|---|---|---|---|---|---|
| Nylon 6.6 | 39.5 | 36 | 31 | — | 43 | 34 | 35 | — |
| Nylon 6 | — | 20 | 20 | 51 | 10 | 10 | 10 | 45 |
| PA6I6T | — | — | — | — | — | 5 | — | — |
| Glass Fibers | 27 | 25 | 30 | 30 | 25 | 25 | 30 | 30 |
| Dehydrated Zinc Borate (Firebrake ® 500) | — | — | — | 1 | 2 | 1 | 1 | — |
| Melamine Pyrophosphate (Budit 341) | — | — | — | — | 11.3 | 11.5 | 11.5 | 11.5 |
| Zinc Phosphinate (Exolit ® OP 950) | — | — | — | — | 8.7 | 11.5 | 11.5 | 11.5 |
| Aluminum Phosphinate (Exolit ® OP 1312) | — | 18 | 18 | 18 | — | — | — | — |
| Brominated Polystyrene FR (Saytex ® HP-3010) | 22.0 | — | — | — | — | — | — | — |
| Antimony Trioxide | 6 | — | — | — | — | — | — | — |
| Boron Oxide/Zinc Oxide (Firebrake ® ZB) | 2 | — | — | — | — | — | — | — |
| Ethylene Acrylic Acid Copolymer | 2.5 | — | — | — | — | — | — | — |
| Stabilizers/Lubricants | 1 | 1 | 1 | 1 | 1 | 1 | 1 | 1 |

Once formed, the resulting compositions were then injected molded at a temperature of about 280° C. and a tool temperature of from 80° C. to 90° C.

The injection molded samples of Examples 7-14 were tested for various properties as described above. The results are set forth below.

|  | Ex. 7 | Ex. 8 | Ex. 9 | Ex. 10 | Ex. 11 | Ex. 12 | Ex. 13 | Ex. 14 |
|---|---|---|---|---|---|---|---|---|
| UL94 0.4 mm | V0 | V0/V2 | V0/V2 | V0/V2 | V0/V2 | V0 | V0 | V0 |
| UL94 0.8 mm | V0 | V0 | V0 | V0 | V2 | V0 | V0 | V0 |
| UL94 1.6 mm | V0 | V0 | V0 | V0 | V0 | V0 | V0 | V0 |
| GWIT (0.4 mm) | >800 | 775 | 800 | 775 | 775 | 850 | 825 | 825 |
| GWIT (0.8 mm) | >800 | 675 | 725 | 725 | 775 | 850 | 825 | 825 |
| GWIT (1.6 mm) | >800 | 675 | 725 | 725 | 775 | 850 | 825 | 825 |
| GWIT (3.2 mm) | >800 | — | — | — | 775 | 850 | 850 | 850 |
| GWFI (0.4 mm) | >850 | 960 | 960 | 960 | 960 | 960 | 960 | 960 |
| GWFI (0.8 mm) | >850 | 960 | 960 | 960 | 960 | 960 | 960 | 960 |
| GWFI (1.6 mm) | >800 | 960 | 960 | 960 | 960 | 960 | 960 | 960 |
| GWFI (3.2 mm) | >850 | — | — | — | 960 | 960 | 960 | 960 |
| CTI (3.0 mm) | >325 | 600 | 600 | 600 | — | 600 | 600 | 600 |
| Tensile Yield Strength (MPa) | 130.0 | 129.1 | 140.3 | 138.0 | 139.1 | 134.7 | 143.2 | 144.0 |
| Elongation at Break (%) | 3.0 | 3.0 | 2.9 | 2.9 | 3.0 | 2.8 | 2.9 | 2.7 |
| Tensile Modulus (MPa) | 8,500 | 8,885 | 10,441 | 10,318 | 8,893 | 9,496 | 10,816 | 10,424 |
| Charpy Notched at 23° C. (kJ/m$^2$) | 8.0 | 9.0 | 10.0 | 12.0 | 7.8 | 9.2 | 10.1 | 13.7 |
| Charpy Notched at −30° C. (kJ/m$^2$) | — | 7.8 | 9.1 | 10.0 | 6.6 | 7.7 | 9.3 | 11.0 |
| Corrosion at 300° C. (mg) | — | 5.1 | 7.6 | 5.5 | 4.3 | 7.0 | 5.4 | 3.0 |

The compositions were also formed into standard terminal blocks/connectors and tested at three positions for GWEPT as described above. The results are set forth below.

|  | Ex. 7 | Ex. 8 | Ex. 9 | Ex. 10 | Ex. 11 | Ex. 12 | Ex. 13 | Ex. 14 |
|---|---|---|---|---|---|---|---|---|
| GWEPT (position 1) | — | — | 725 | 750 | — | 750 | 750 | 775 |
| GWEPT (position 2) | — | — | 750 | 750 | — | 775 | 750 | 775 |
| GWEPT (position 3) | — | — | 725 | 725 | — | 775 | 750 | 775 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A polyamide composition comprising a polyamide, a plurality of inorganic fibers, and a flame retardant system comprising:
(a) a zinc phosphinate having the general formula (I):

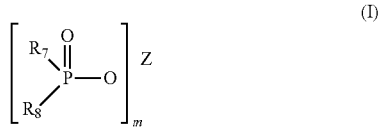

wherein,
R$_7$ and R$_8$ are, independently, hydrogen or substituted or unsubstituted, straight chain, branched, or cyclic hydrocarbon groups having 1 to 6 carbon atoms;
Z is zinc; and
m is 2,
(b) a nitrogen-containing polyphosphate having the following general formula:

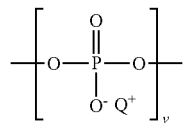

v is from 1 to 1000; and
Q is melamine, and
(c) zinc borate,
wherein nitrogen-containing polyphosphates constitute from about 40 wt. % to about 70 wt. % of the flame retardant system, zinc phosphinates constitute from about 20 wt. % to about 54 wt. % of the flame retardant system and from about 5 wt. % to about 13 wt. % of the polyamide composition, and zinc borate constitutes from about 2 wt. % to about 15 wt. % of the flame retardant system, and wherein at thicknesses of from about 0.4 to about 3.2 millimeters, the composition exhibits:

a Glow Wire Ignition Temperature of about 775° C. or more as determined in accordance with IEC-60695-2-13:2010.

2. The polyamide composition of claim 1, wherein polyamides constitute from about 30 wt. % to about 80 wt. % of the composition, inorganic fibers constitute from about 5 wt. % to about 50 wt. % of the composition, and/or the flame retardant system constitutes from about 5 wt. % to about 40 wt. % of the composition.

3. The polyamide composition of claim 1, wherein the phosphinate is a zinc salt of dimethylphosphinic acid, ethylmethylphosphinic acid, diethylphosphinic acid, methyl-n-propylphosphinic acid, methylphenylphosphinic acid, diphenylphosphinic acid, hypophosphoric acid, or a mixture thereof.

4. The polyamide composition of claim 1, wherein v is from 2 to 500.

5. The polyamide composition of claim 1, wherein nitrogen-containing polyphosphates constitute from about 1 wt. % to about 30 wt. % of the composition.

6. The polyamide composition of claim 1, wherein zinc borate constitutes from about 3 wt. % to about 10 wt. % of the flame retardant system.

7. The polyamide composition of claim 1, wherein zinc borate constitutes from about 0.1 wt. % to about 10 wt. % of the composition.

8. The polyamide composition of claim 1, further comprising an aromatic compound, wherein the aromatic compound constitutes from about 1 wt. % to about 25 wt. % of the composition.

9. The polyamide composition of claim 8, wherein the aromatic compound comprises terephthalic acid.

10. The polyamide composition of claim 1, wherein the polyamide is an aliphatic polyamide.

11. The polyamide composition of claim 10, wherein the aliphatic polyamide is nylon-6, nylon-6,6, or a combination thereof.

12. The polyamide composition of claim 1, wherein the polyamide is a semi-aromatic polyamide or a wholly aromatic polyamide.

13. The polyamide composition of claim 1, wherein the inorganic fibers include glass fibers.

14. The polyamide composition of claim 1, wherein the halogen content of the flame retardant system is about 1,000 parts per million or less.

15. The polyamide composition of claim 1, wherein the halogen content of the composition is about 1,000 parts per million or less.

16. The polyamide composition of claim 1, wherein at thicknesses of from about 0.4 to about 3.2 millimeters, the composition exhibits a Glow Wire End Product Temperature (without flame) of about 750° C. or more as determined in accordance with IEC-60335-1:2010.

17. The polyamide composition of claim 1, wherein at thicknesses of from about 0.4 to about 3.2 millimeters, the composition exhibits a Glow Wire Flammability Index of about 850° C. or more as determined in accordance with IEC-60695-2-12:2010.

18. The polyamide composition of claim 1, wherein at thicknesses of from about 0.4 to about 3.2 millimeters, the composition exhibits a V0 rating as determined in accordance with UL94.

19. The polyamide composition of claim 1, wherein at thicknesses of from about 0.4 to about 3.2 millimeters, the composition exhibits a comparative tracking index of about 550 volts or more as determined in accordance with IEC 60112:2003.

20. An electrical connector that comprises opposing walls between which a passageway is defined for receiving a contact pin, wherein at least one of the walls contains the polyamide composition of claim 1.

21. The electrical connector of claim 20, wherein at least one of the walls has a thickness of about 4 millimeters or less.

22. An electrical connector that comprises opposing walls between which a passageway is defined for receiving a contact pin, wherein at least one of the walls contains the polyamide composition of claim 1 and has a thickness of about 4 millimeters or less, wherein the compositions exhibits:
- a Glow Wire End Product Temperature (without flame) of about 750° C. or more as determined in accordance with IEC-60335-1:2010;
- a Glow Wire Flammability Index of about 850° C. or more as determined in accordance with IEC-60695-2-12:2010;
- a V0 rating as determined in accordance with UL94; and/or
- a comparative tracking index of about 550 volts or more as determined in accordance with IEC 60112:2003.

* * * * *